US012688254B1

(12) United States Patent
Huang et al.

(10) Patent No.: US 12,688,254 B1
(45) Date of Patent: Jul. 21, 2026

(54) METHOD AND APPARATUS FOR LOGARITHMIC MATHEMATICS IN AI MATRIX MULTIPLICATIONS

(71) Applicant: Tensordyne, Inc., San Jose, CA (US)

(72) Inventors: Jian Hui Huang, Los Altos, CA (US); Gary S. Goldman, Los Altos, CA (US); Jan Lennart Haug, Munich (DE); Michael Wilhelm Laraia, Munich (DE); Lukas Rinder, Munich (DE)

(73) Assignee: Tensordyne, Inc., Sunnyvale, CA (US)

( * ) Notice: Subject to any disclaimer, the term of this patent is extended or adjusted under 35 U.S.C. 154(b) by 0 days.

(21) Appl. No.: 19/552,055

(22) Filed: Feb. 27, 2026

(51) Int. Cl.
*G06F 17/16* (2006.01)

(52) U.S. Cl.
CPC .......... *G06F 17/16* (2013.01); *G06F 2101/10* (2013.01)

(58) Field of Classification Search
CPC .......... G06F 7/483–4876; G06F 7/556; G06F 17/11–12; G06F 17/15–16; G06F 2101/02; G06F 2101/10; G06N 3/02; G06N 3/0464; G06N 3/04; G06N 3/0475; G06N 3/0495; G06N 3/0499; G06N 3/047
See application file for complete search history.

(56) References Cited

U.S. PATENT DOCUMENTS 10,445,064 B2    10/2019    Pillai et al.
11,468,302 B2    10/2022    Feinberg
2017/0011288 A1*    1/2017    Brothers ............... G06F 9/3017
2020/0073912 A1    3/2020    Hiroi et al.
2020/0218509 A1*    7/2020    Xu ......................... G06F 7/4812
(Continued)

OTHER PUBLICATIONS

J. Y. L. Low and C. C. Jong, "Unified Mitchell-Based Approximation for Efficient Logarithmic Conversion Circuit," in IEEE Transactions on Computers, vol. 64, No. 6, pp. 1783-1797, Jun. 1, 2015, doi: 10.1109/TC.2014.2329683. (Year: 2015).*
(Continued)

*Primary Examiner* — Andrew Caldwell
*Assistant Examiner* — Huy Duong
(74) *Attorney, Agent, or Firm* — Ascenda Law Group, PC

(57) ABSTRACT

A matrix multiplication system and method are disclosed that perform multiplication in a logarithmic domain and accumulation in a linear domain using co-designed bidirectional conversion circuits. Linear-domain operands are converted to a logarithmic domain by a linear-to-logarithmic conversion that divides a mantissa into exactly four non-uniform windows and applies affine mappings implemented using shift and add operations. Logarithmic-domain multiplication results are converted to linear-domain values by a logarithmic-to-linear conversion that divides a mantissa into exactly four equal-width windows and applies corresponding affine mappings implemented using shift and add operations. The affine mappings of the linear-to-logarithmic conversion are analytic inverses of the affine mappings of the logarithmic-to-linear conversion, and window boundaries of the linear-to-logarithmic conversion are derived by inverse mapping of the logarithmic-to-linear window boundaries. The conversion circuits are co-designed to provide round-trip exactness apart from quantization effects, thereby avoiding systematic bias during accumulation.

30 Claims, 10 Drawing Sheets

(56) References Cited

U.S. PATENT DOCUMENTS

| 2021/0056397 A1 | 2/2021 | Dally et al. |
| 2021/0056446 A1 | 2/2021 | Dally et al. |

OTHER PUBLICATIONS

Dally, Bill, "Logarithmic Numbers and Asynchronous Accumulators. The Future of DL Chips." Presentation Slides from Chips & Compilers Symposium at MLSys 2021, Apr. 5, 2021, 60 pp.

Miyashita; et al., "Convolutional Neural Networks using Logarithmic Data Representation", computarXiv:1603.01025v2 [cs.NE] Mar. 17, 2016, 10 pp.

Niu; et al., "A Logarithmic Floating-Point Multiplier for the Efficient Training of Neural Networks", GLSVLSI '21: Great Lakes Symposium on VLSI 2021, Jun. 22-25, 2021, pp. 65-70.

Xiong; et al., "Hardware Complexity Aware Design Strategy for a Fused Logarithmic and Anti-Logarithmic Converter", Manuscript submitted in Nov. 12, 2020, School of Microelectronics, Dalian University of Tachnology, Dalian, China, 5 pp.

* cited by examiner

METHOD AND APPARATUS FOR LOGARITHMIC MATHEMATICS IN AI MATRIX MULTIPLICATIONS

FIELD OF THE INVENTION

The present disclosure relates generally to hardware accelerators for artificial intelligence (AI) and machine learning workloads, and more particularly to matrix multiplication engines employing logarithmic arithmetic with bidirectional conversion between logarithmic and linear domains.

BACKGROUND

Matrix multiplication is the dominant computational operation in modern AI systems, including deep neural networks, large language models (LLMs), and other data-intensive inference and training workloads. Conventional matrix multiplication relies heavily on floating-point multiplication and accumulation in the linear domain, which incurs substantial power consumption and hardware cost.

Logarithmic number systems offer an attractive alternative for multiplication, since multiplication in the linear domain may be replaced by addition in the logarithmic domain. However, matrix multiplication inherently requires accumulation, which must be performed in the linear domain. As a result, practical logarithmic matrix multiplication architectures require frequent conversion between logarithmic and linear representations.

Existing logarithmic conversion techniques, including Mitchell-based approximations and generic piecewise-linear converters, suffer from one or more drawbacks, including excessive approximation error, systematic bias during accumulation, reliance on lookup tables, or hardware complexity that scales poorly with accuracy.

Accordingly, there is a need for a hardware-efficient, accurate, and bias-free bidirectional conversion scheme that enables logarithmic arithmetic to be deployed effectively within matrix multiplication engines.

U.S. Pat. No. 10,445,064 describes one hardware implementation of logarithmic and antilogarithmic operations based on piecewise linear approximation. In particular, the '064 patent discloses converting floating-point numbers between logarithmic and linear representations by dividing a mantissa into multiple intervals and applying linear equations within each interval. The disclosed techniques operate on floating-point numbers represented by sign, exponent, and mantissa components, and generate approximations of logarithmic or antilogarithmic values using shift and add operations rather than lookup tables or general-purpose multipliers.

In the disclosed approaches, the mantissa may be divided into a selectable number of intervals, such as four, five, or sixteen intervals, with corresponding linear equations defined for each interval. The coefficients of the linear equations are selected to simplify hardware implementation, for example by enabling bit-shift operations. Separate circuits are described for logarithmic conversion and for anti-logarithmic conversion, each performing a piecewise linear approximation of the mantissa while preserving the sign and exponent portions of the floating-point representation.

The '064 patent further describes integrating such piecewise linear logarithmic and antilogarithmic conversion circuits into general-purpose processors, graphics processors, and system-on-chip architectures, where the conversion circuits may be used to support arithmetic operations, signal processing, or graphics workloads. Error characteristics of the piecewise linear approximations are analyzed, and the number of intervals may be adjusted to tradeoff between accuracy and hardware cost.

SUMMARY

Various embodiments of the present invention include methods and systems as recited in the accompanying claims.

The present disclosure provides a matrix multiplication processing system that performs multiplication in the logarithmic domain and accumulation in the linear domain using co-designed, reciprocal conversion circuits.

In one embodiment, a logarithmic-to-linear conversion circuit divides a mantissa range into exactly four equal-width windows, each mapped using an affine function implemented with shift-and-add operations. A corresponding linear-to-logarithmic conversion circuit employs exactly four non-uniform windows, the boundaries of which are derived by inverse mapping of the logarithmic-to-linear window boundaries.

The two conversion circuits are analytically reciprocal, such that round-trip conversion is mathematically exact apart from quantization effects, thereby eliminating systematic bias during accumulation.

The linear-to-logarithmic conversion circuit is shared across multiple logarithmic logic cores and positioned upstream of the matrix multiplication engine, while the logarithmic-to-linear conversion circuit is positioned within each logic core, immediately prior to linear-domain accumulation.

In one embodiment, the disclosed processing system improves operation of a matrix multiplication engine by reducing hardware cost and reducing systematic error accumulation associated with repeated conversions between logarithmic and linear representations. In particular, the disclosed linear-to-logarithmic and logarithmic-to-linear conversion circuits are co-designed as reciprocal pairs such that a value converted from one domain to the other and back again returns to its original value exactly, apart from quantization effects associated with finite-precision representation. This round-trip exactness reduces systematic bias that would otherwise accumulate during repeated conversion and summation in matrix multiplication pipelines, while enabling implementation using shift-and-add circuitry without lookup tables or general-purpose multipliers.

BRIEF DESCRIPTION OF THE DRAWINGS

The present invention is illustrated by way of example, and not limitation, in the figures of the accompanying drawings, in which.

DETAILED DESCRIPTION

Figure 1:
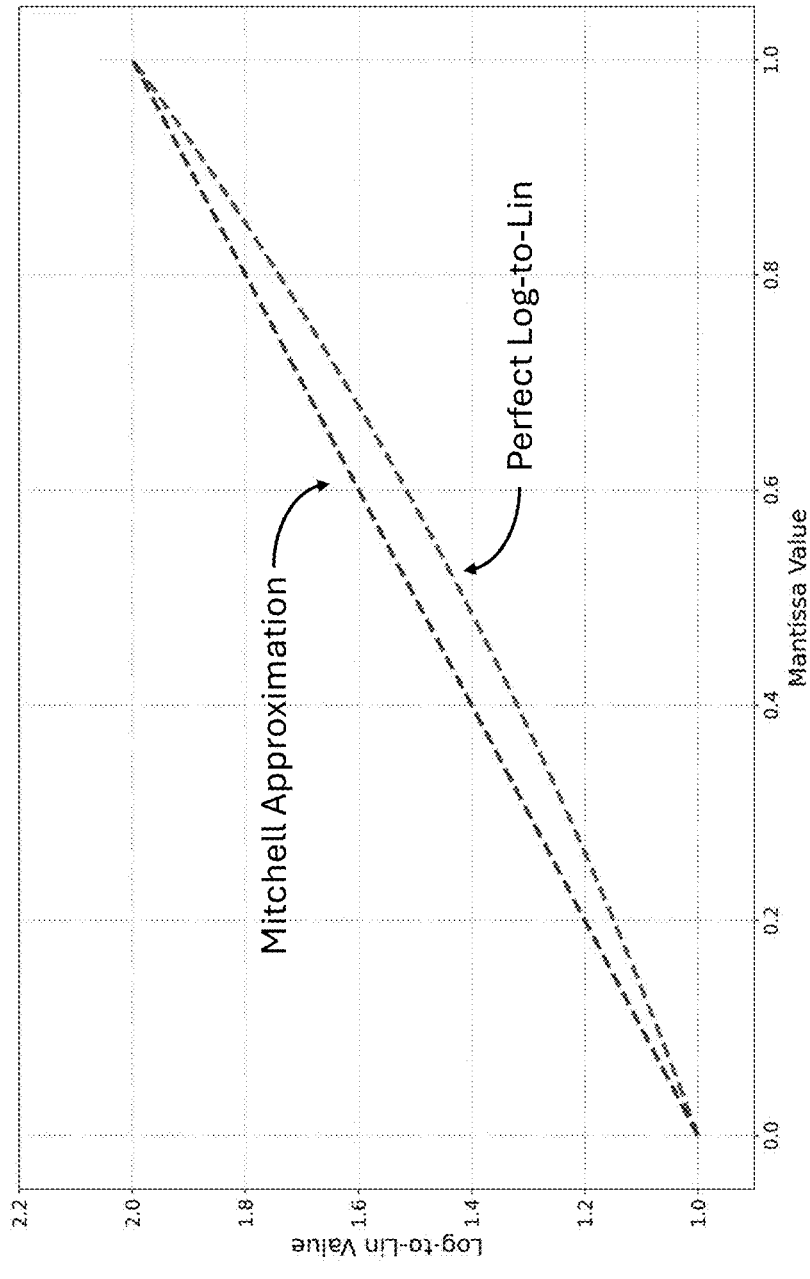
FIG. 1 is a graph providing a comparison of "perfect math" results vs. Mitchell approximation results in data conversion from logarithmic-to-linear domains.

Described herein are embodiments of a matrix multiplication processing system that performs multiplication in the logarithmic domain and accumulation in the linear domain using co-designed, reciprocal conversion circuits, e.g., which may form part of a fixed-function data path within an application-specific integrated circuit (ASIC) or accelerator fabric As used herein, an "analytic inverse" between a first mapping and a second mapping means that, for values within a corresponding window, application of the first mapping followed by the second mapping returns the original value, apart from quantization and rounding associated with finite-precision representation. "Quantization effects" include rounding and/or truncation effects arising from representing mantissas and intermediate results using finite-precision fixed-point or floating-point formats, including any rounding modes applied at conversion circuit outputs.

As discussed in greater detail below, in one embodiment, the matrix multiplication processing system includes a matrix multiplication engine that includes a plurality of logarithmic logic cores (LLCs). Each LLC is configured to perform multiplication in a logarithmic domain and accumulation in a linear domain. The processing system also includes a linear-to-logarithmic conversion circuit positioned upstream of the matrix multiplication engine and shared by the plurality of LLC. The linear-to-logarithmic conversion circuit is configured to convert input operand values from the linear domain to the logarithmic domain prior to distribution to the logarithmic logic cores. To do so, the linear-to-logarithmic conversion circuit includes a mantissa window selector configured to divide a mantissa of a linear-domain operand into exactly four non-uniform windows; and, for each of the four windows, a corresponding affine mapping implemented using only shift and add operations to generate a logarithmic-domain mantissa value. Disposed within each logarithmic logic core is a logarithmic-to-linear conversion circuit configured to convert logarithmic-domain multiplication results to linear-domain values prior to accumulation. The logarithmic-to-linear conversion circuits each include a mantissa window selector configured to divide a mantissa of a logarithmic-domain value into exactly four equal-width windows over a range [0,1) based on most-significant bits of the mantissa; and, for each of the four equal-width windows, a corresponding affine mapping implemented using only shift and add operations to generate a linear-domain mantissa value. Notably, each affine mapping of the linear-to-logarithmic conversion circuit is an analytic inverse of a corresponding affine mapping of the logarithmic-to-linear conversion circuit. The non-uniform window boundaries of the linear-to-logarithmic conversion circuit are computed from window boundaries of the logarithmic-to-linear conversion circuit by inverse mapping. Further, the linear-to-logarithmic conversion circuit and the logarithmic-to-linear conversion circuit are co-designed such that a round-trip conversion of a mantissa through both conversion circuits is mathematically exact, apart from quantization effects, thereby avoiding systematic bias during accumulation within the matrix multiplication engine.

In various embodiments of the present processing system, the four equal-width windows of the logarithmic-to-linear conversion circuit each span one-quarter of a mantissa range [0,1). The mantissa window selector of the logarithmic-to-linear conversion circuit identifies the four equal-width windows using two most-significant bits of the mantissa. The non-uniform window boundaries of the linear-to-logarithmic conversion circuit correspond to inverse images of boundary points of the four equal-width windows of the logarithmic-to-linear conversion circuit. These inverse images may be computed by algebraic inversion of the affine mappings of the logarithmic-to-linear conversion circuit. Accordingly, each affine mapping of the linear-to-logarithmic conversion circuit and its corresponding affine mapping of the logarithmic-to-linear conversion circuit form a bijective pair over a corresponding window. The round-trip conversion preserves monotonic ordering of mantissa values across all four windows and introduces no systematic bias in accumulated results across repeated matrix multiplication operations. Note, as used herein, an affine mapping includes linear functions with an offset and may be implemented using fixed-point coefficients selected to favor shift-and-add hardware realization.

The structure of the present processing system means that each affine mapping is implemented without a lookup table and without a general-purpose multiplier. Instead, each affine mapping includes only bit-shift operations, add operations, and subtract operations. Preferably, coefficients used in the affine mappings are powers of two or sums of powers of two.

In various embodiments of the present processing system, each mantissa value may correspond to a mantissa of a floating-point value formatted according to an IEEE-754 standard. The IEEE Standard for Floating-Point Arithmetic (IEEE 754) is a technical standard for floating-point computation which was established in 1985 by the Institute of Electrical and Electronics Engineers (IEEE). In the IEEE 754 floating-point standard, the mantissa (or significand) represents the precision bits of a number, consisting of 23 explicit fraction bits in single-precision (32-bit) or 52 in double precision (64-bit). In a preferred embodiment, the mantissa value may be stored in normalized form, meaning an implicit leading 1-bit exists before the radix point, allowing for 24 or 53 bits of total precision. However, in other embodiments, a sub-normal or denormal representation, in which no implicit leading 1-bit exists, may be used. Further, in some cases, the floating-point value may a half-precision floating-point value. In embodiments of the present processing, exponent values are preserved during conversion and only mantissa values are modified by the conversion circuits.

The linear-to-logarithmic conversion circuit of the present processing system may be configured to convert input operands once and distribute converted operands to multiple logarithmic logic cores. Each logarithmic logic core includes a plurality of logarithmic-domain multipliers and a linear-domain adder tree, with the logarithmic-to-linear conversion circuit being positioned between the logarithmic-domain multipliers and the linear-domain adder tree.

Although the '064 patent, mentioned above, discloses hardware-efficient piecewise linear techniques for approximating logarithmic and antilogarithmic functions, those approaches exhibit several limitations when compared to the present invention.

First, the conversion circuits described in the '064 patent are not co-designed as reciprocal pairs. The logarithmic and antilogarithmic conversions are implemented as separate piecewise linear approximations, each optimized independently for approximation accuracy or hardware efficiency. As a result, the '064 patent does not ensure that a value converted from one domain to the other and back again will return to its original value apart from quantization effects. This lack of analytic reciprocity can introduce systematic bias when repeated conversions occur, particularly in workloads involving accumulation of many intermediate results.

Second, the '064 patent does not describe deriving window boundaries or affine mappings of a linear-to-logarithmic conversion directly from the inverse of a logarithmic-to-linear conversion. Instead, window segmentation and linear equations are selected independently in each direction, and accuracy is adjusted primarily by increasing the number of intervals. This independent design approach increases implementation complexity and does not address round-trip exactness as a design constraint.

Third, while the '064 patent contemplates using piecewise linear logarithmic and antilogarithmic converters in general-purpose processors, graphics processors, and system-on-chip architectures, it does not disclose a matrix-multiplication-specific architecture in which multiplication is performed in the logarithmic domain and accumulation is performed in the linear domain within a dedicated matrix multiplication engine. In particular, the '064 patent does not describe logarithmic-domain multipliers feeding linear-domain adder trees within per-core computation cells, nor does it address the architectural placement of conversion circuits relative to accumulation logic.

Fourth, the '064 patent does not address amortization of conversion cost across multiple computation cores. Conversion circuits in the '064 patent operate as general arithmetic units, rather than as shared pre-processing units whose cost is amortized across many parallel matrix multiplication operations, as in the present invention.

Finally, because the '064 patent relies on increasing the number of piecewise intervals to improve accuracy, achieving higher precision typically requires additional segmentation logic and control complexity. In contrast, the present invention achieves high accuracy and eliminates systematic bias using a fixed number of primary windows through reciprocal, inverse-derived mappings, thereby providing a more scalable and hardware-efficient solution for matrix multiplication workloads.

1. The Mitchell Approximation.

As noted above, AI applications, especially LLMs and generative AI implementations, involve significant volumes of computation, the dominant operations of which are matrix multiplications. By introducing logarithmic operations to matrix multiplication, the traditional multiplication steps are replaced by summations, significantly reducing the overall computational cost. However, while the multiplications benefit from the logarithmic domain, summations must still be performed in the linear domain. Consequently, the use of logarithmic operations in matrix multiplication requires frequent data conversions between linear and logarithmic domains; conversions that must be both highly accurate in terms of their results and low-cost in terms of their impact on computational workload.

The Mitchell approximation was created to convert data between the linear domain and the logarithmic domain. As shown by Equation 1, below, floating point data, $Data_{lin}$, in the linear domain can be expressed in terms of a sign bit, S, an exponent, E, and a mantissa, $m_{lin}$ (note, for simplicity the exponent bias is not included). FP16 mantissa $m_{lin}$ can be expressed as shown in Equation 2. The mantissa $m_{lin}$ value always satisfies $0 \le m_{lin} < 1$, or [0,1).

$$Data_{lin} = (-1)^S \times 2^E \times (1 - m_{lin}) \quad \text{Equation 1}$$

$$m_{lin} = \sum_{i=1}^{10} b_{10-i} 2^{-i} \quad \text{Equation 2}$$

The floating point data in the logarithmic domain can be expressed as set forth in Equation 3, where $m_{log}$ is the mantissa value when data is in the logarithmic domain.

$$Data_{log} = (-1)^S \times 2^E \times (2^{m_{log}}) \quad \text{Equation 3}$$

Comparing Equation 1 and Equation 3, both sign and exponent values remain the same, the only difference lies in the mantissa values $m_{lin}$ and $m_{log}$.

When expressing the same data in both linear and logarithmic domains, Equation 4 must be satisfied; an alternative expression for this relationship is provided in Equation 5:

$$2^{m_{log}} = 1 + m_{lin} \quad \text{Equation 4}$$

$$m_{log} = \log_2(1 + m_{lin}) \quad \text{Equation 5}$$

A matrix multiplication (MatMul) C=A×B can be expressed as in Equation 6:

$$C_{i,j} = \sum_{k=0}^{N-1} A_{i,k} \times B_{k,j} \quad \text{Equation 6}$$

Equation 6 involves N multiplications and N summations, where N is the inner shared dimension of the MatMul. If the multiplications are performed in the logarithmic domain while the summations have to occur in the linear domain, then both log-to-linear and linear-to-log data conversions are required. The procedure is outlined below:

1. Convert $A_{i,k}$ and $B_{k,j}$ from the linear domain to the logarithmic domain.
2. Perform multiplication $A_{i,k} \times B_{k,j}$ in the logarithmic domain. The result is in the logarithmic domain.

3. Convert all the multiplication products in step 2 into the linear domain.

4. Conduct summation among results from step 3. The final result $C_{i,j}$ is in the linear domain.

The Mitchell approximation takes advantage of the fact that the mantissa $m_{lin}$ is between 0 and 1, converting Equation 5 into Equation 7:

$$m_{log} = \log_2(1 + m_{lin}) \cong m_{lin} \qquad \text{Equation 7}$$

Equation 7 can be implemented in hardware in an efficient manner and will yield exact results when $m_{lin}$ is zero. But it introduces errors when $m_{lin}$ is non-zero. While the error diminishes as $m_{lin}$ approaches 0 or 1, it reaches a maximum when $m_{lin}$ is roughly midway between 0 and 1. This is illustrated in FIG. 1, which shows results of a logarithm-to-linear (log-to-lin) domain conversion for data values between 0 and 1 according to "perfect math" (i.e., an exact computation according to Equation 5) vs. the Mitchell approximation, where $m_{log} \cong m_{lin}$.

Figure 2:
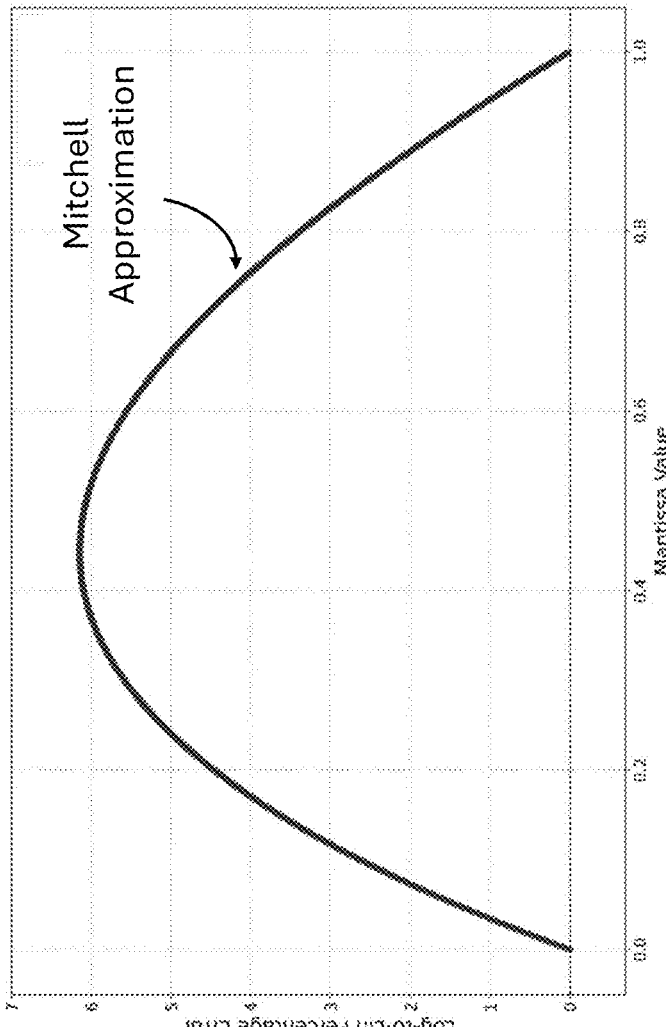
FIG. 2 is a graph showing percentage error of Mitchell approximation results in conversions from logarithmic-to-linear domains.

As shown in FIG. 2, the maximum percentage error for the Mitchell approximation vs. the "perfect" computation at any given mantissa value between 0 and 1 is 6.148%, while the root-mean-square (RMS) error is 4.466% and the simple average percentage error is 4.068%. The latter being calculated by summing all individual percentage errors (rather than their absolute values) and dividing by the total number of data points. This metric indicates whether the positive and negative errors are balanced.

2. The New Approach.

In one embodiment, the present invention provides a bidirectional (log-to-lin and lin-to-log) conversion between the logarithmic and linear domains that is not only efficient for chip-based implementation but also highly accurate in terms of substantially reducing errors introduced by the Mitchell approximation. The round-trip conversion is mathematically exact, excluding the effects of quantization.

In one embodiment, the approach introduced in this invention divides the whole mantissa region into four sub-regions and provides domain conversions for each sub-region. In further embodiments, this idea can be extended to further improve accuracy; for example, the number of sub-regions can be increased to 8 or 16, etc. More sub-regions, however, are not necessarily desirable as the computational burden imposed by same will increase. Thus, the inventors have found that four sub-regions provide a good balance between improved accuracy and low computational cost.

Although increasing the number of piecewise regions can reduce approximation error, increasing segmentation typically increases selection logic and coefficient handling complexity and may increase hardware cost in cost-sensitive data paths. The disclosed approach instead constrains forward and inverse conversions as reciprocal pairs with inverse-derived window boundaries, providing round-trip exactness apart from quantization effects and reducing systematic bias in conversion-heavy matrix multiplication pipelines without requiring increased primary segmentation.

3. Conversion From Logarithmic to Linear Domain.

In converting from the logarithmic to linear domain, $m_{log}$ in Equation 4 is known, and $m_{lin}$ is computed based on $m_{log}$ as follows:

8

$$m_{lin} = \begin{cases} m_{log} + 9(m_{log} - 1)/32 & \text{if } 0.75 \le m_{log} < 1 \\ m_{log} + (8m_{log} - 15)/128 & \text{if } 0.5 \le m_{log} < 0.75 \\ m_{log} - (12m_{log} + 5)/128 & \text{if } 0.25 \le m_{log} < 0.5 \\ 3m_{log}/4 & \text{if } 0 \le m_{log} < 0.25 \end{cases} \qquad \text{Equation 8}$$

In one embodiment of a processing system for matrix multiplication operations, selection of an appropriate mantissa window may be performed using simple combinational control logic, rather than a lookup table. For the logarithmic-to-linear conversion, the four equal-width windows may be identified directly using two most-significant bits of the logarithmic-domain mantissa. For the linear-to-logarithmic conversion, the non-uniform windows may be selected using comparator logic that evaluates the linear-domain mantissa against the inverse-derived boundary values. In either case, window selection logic may be implemented using comparators, multiplexers, or equivalent combinational circuitry, and does not require memory-based tables or iterative control structures. In other embodiments a lookup table may be used, although this may entail a computational penalty.

Figure 3:
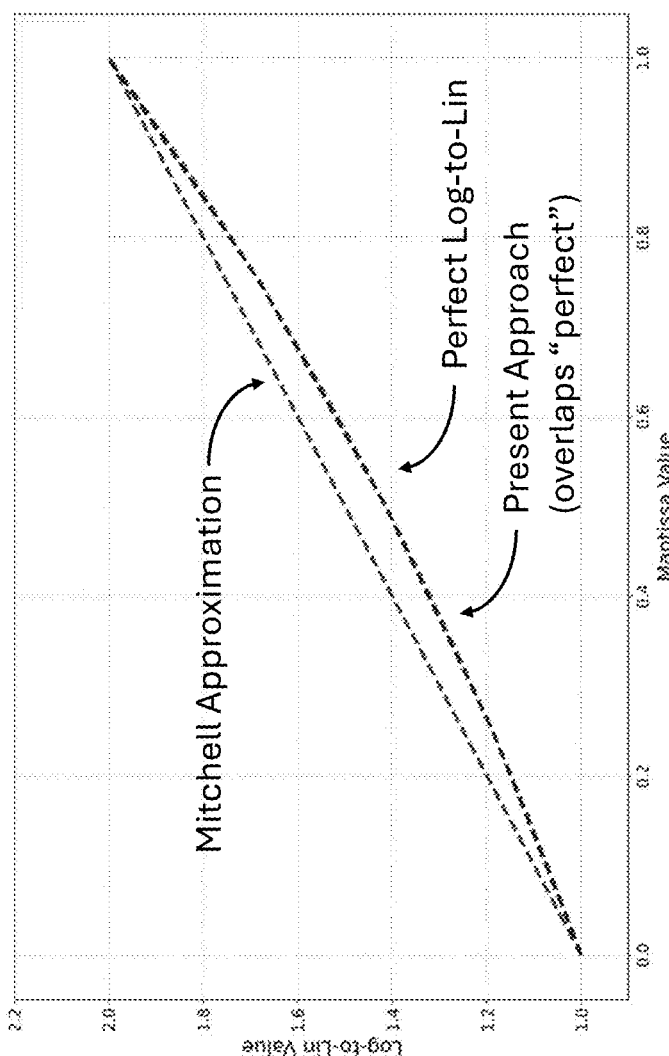
FIG. 3 is a graph providing a comparison between perfect math results, Mitchell approximation results and results obtained using the presently proposed approach in data conversions from logarithmic-to-linear domains.
Figure 4:
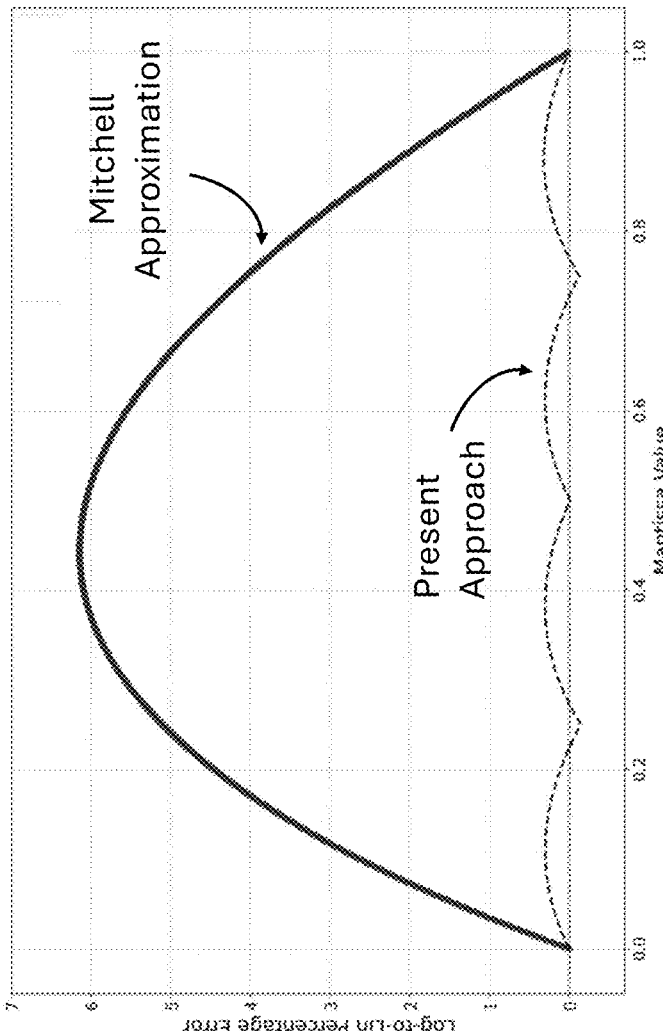
FIG. 4 is a graph providing a comparison between percentage error of Mitchell approximation results and results obtained using the presently proposed approach in data conversions from logarithmic-to-linear domains.
Figure 5:
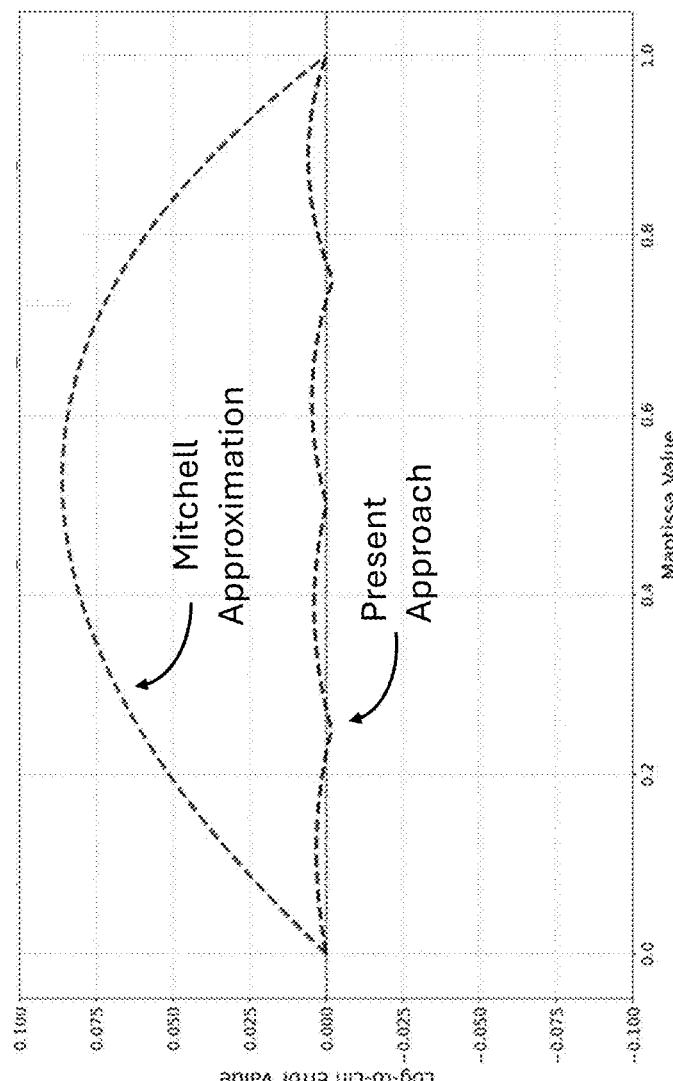
FIG. 5 is a graph providing a comparison between errors of Mitchell approximation results and results obtained using the presently proposed approach in data conversions from logarithmic-to-linear domains.

FIG. 3 compares log-to-linear conversion results for the perfect math exact computation, the Mitchell approximation, and our proposed approach. As shown, there is little to no appreciable deviation in result accuracy between results for an exact computation and those obtained using Equation 8 at any mantissa value. FIG. 4 compares maximum, RMS, and average percentage errors for the Mitchell approximation versus our logarithmic-to-linear conversion using Equation 8. Whereas the Mitchell approximation yielded maximum percentage error of 6.148%, RMS percentage error of 4.466%, and average percentage error of 4.068%, our proposed approach yielded maximum percentage error of 0.319%, RMS percentage error of 0.216%, and average percentage error of 0.180%. FIG. 5 compares maximum, RMS, and average errors for the Mitchell approximation versus our proposed logarithmic-to-linear conversion without fine-tuning term. While the Mitchell approximation yielded maximum error of 0.08607, RMS error of 0.06280, and average error of 0.05730, our proposed approach yielded maximum error of 0.00589, RMS error of 0.00320, and average error of 0.00262.

Table 1 below provides a summary of these performance measures for the logarithmic-to-linear domain conversion. Note, these results are reported for only the mantissa part of the data, including the leading bit.

TABLE 1

| Logarithmic-to-Linear Domain Conversion Performance Summary | | | |
|---|---|---|---|
| | Mitchell Approximation | Present Approach (Equation 8) | Improvement |
| Worst Case Percentage Error | 6.148% | 0.319% | 19.3X |
| RMS Average Percentage Error | 4.466% | 0.216% | 20.7X |
| Average Percentage Error | 4.068% | 0.180% | 22.6X |
| Worst Case Error | 0.08607 | 0.00589 | 14.6X |
| RMS Average Error | 0.06280 | 0.00320 | 19.6X |
| Average Error | 0.05730 | 0.00262 | 21.9X |

4. Conversion From Linear to Logarithmic Domain.

In converting from the linear to the logarithmic domain, $m_{lin}$ in Equation 5 is known, and $m_{log}$ is computed based on $m_{lin}$ in Equation 9 below.

$$m_{log} = \begin{cases} (32m_{lin}+9)/41 & \text{if } 87/128 \leq m_{lin} < 1 \\ 16m_{lin}/17 + 15/136 & \text{if } 53/128 \leq m_{lin} < 87/128 \\ 32m_{lin}/29 + 15/116 & \text{if } 3/16 \leq m_{lin} < 53/128 \\ 4m_{lin}/3 & \text{if } 0 \leq m_{lin} < 3/16 \end{cases} \qquad \text{Equation 9}$$

Equation 9 is the inverse of Equation 8. By way of example, in one region where $0.75 \leq m_{log} < 1$, from Equation 8 $m_{lin}$ can be expressed as $m_{log}+9(m_{log}-1)/32$. So, when $m_{log}$ is 0.75 or 1, $m_{lin}$ will be 87/128 or 1, respectively. This is the same as one of the regions ($87/128 \leq m_{lin} < 1$) specified in Equation 9. $m_{lin}=m_{log}+9(m_{log}-1)/32$ can be re-organized as $m_{log}=(32m_{lin}+9)/41$, this is the same as the expression for $m_{log}$ in the region ($87/128 \leq m_{lin} < 1$). Following this method, the expressions for $m_{log}$ in the remaining three regions in Equation 9 can be derived from Equation 8.

As should be appreciated from the foregoing derivation, the window boundaries used in the linear-to-logarithmic conversion are non-uniform. This is an important aspect of the present invention as the use of uniform segmentation of the linear-domain mantissa would disrupt the reciprocal relationship between the two conversions and would introduce systematic round-trip error. That is, the use of equal-width windows in logarithmic-to-linear conversion which divides the logarithmic-domain mantissa range, means the affine mappings for the linear-to-logarithmic conversion require non-uniform window boundaries to preserve analytic reciprocity and round-trip exactness, apart from quantization effects.

As used herein, the phrase "computed from window boundaries . . . by inverse mapping" refers to computing each linear-domain window boundary by applying a reciprocal mapping to a corresponding boundary of the logarithmic-domain window, such that boundaries in one domain correspond to transition points of the reciprocal piecewise mappings in the other domain. In one embodiment, the reciprocal mapping is obtained by algebraic inversion of the corresponding affine mapping in the other direction.

Figure 6:
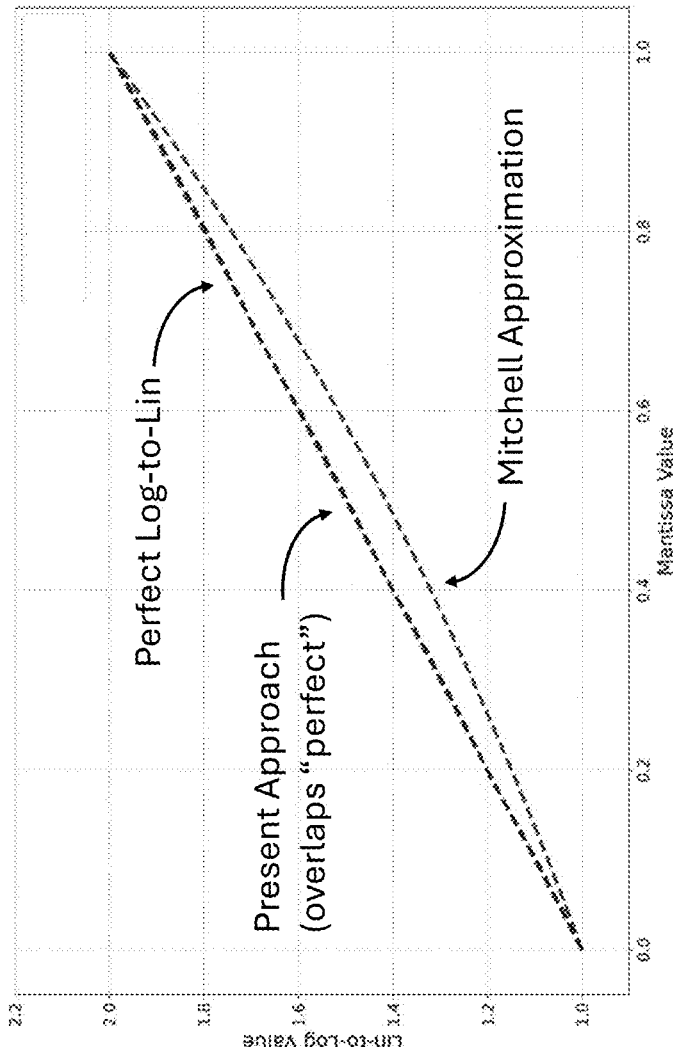
FIG. 6 is a graph providing a comparison between perfect math results, Mitchell approximation results and results obtained using the presently proposed approach in data conversions from linear-to-logarithmic domains.
Figure 7:
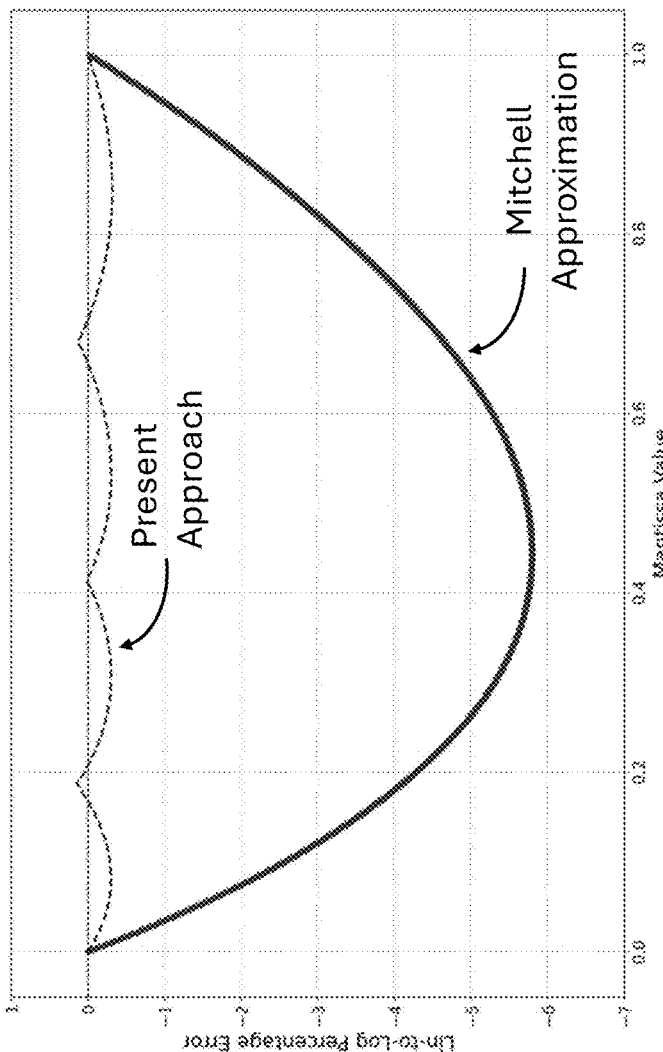
FIG. 7 is a graph providing a comparison between percentage error of Mitchell approximation results and results obtained using the presently proposed approach in data conversions from linear-to-logarithmic domains.
Figure 8:
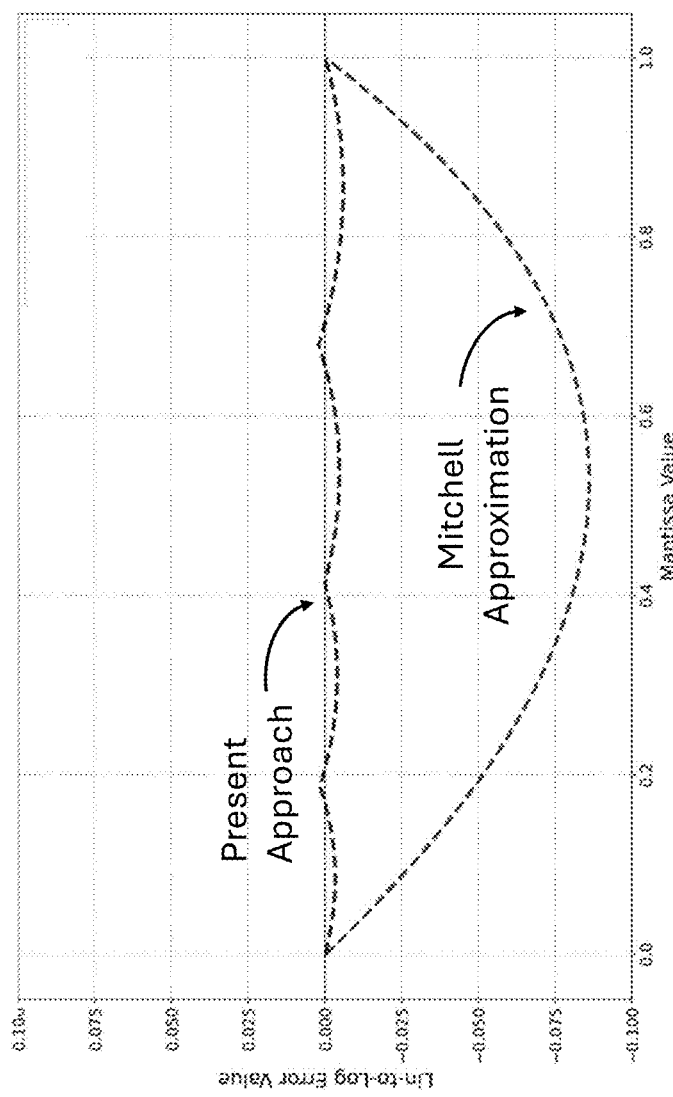
FIG. 8 is a graph providing a comparison between errors of Mitchell approximation results and results obtained using the presently proposed approach in data conversions from linear-to-logarithmic domains.

FIG. 6 compares linear-to-logarithmic conversion results for the perfect math exact computation, the Mitchell approximation, and our proposed approach. As shown, there is little to no appreciable deviation in result accuracy between results for an exact computation and those obtained using Equation 9 at any mantissa value. FIG. 7 compares maximum, RMS, and average percentage errors for the Mitchell approximation versus our approach for linear-to-logarithmic conversion using Equation 9. Whereas the Mitchell approximation yielded maximum percentage error of −5.792%, RMS percentage error of 4.244%, and average percentage error of −3.879%, our proposed approach yielded maximum percentage error of −0.318%, RMS percentage error of 0.216%, and average percentage error of −0.181%. FIG. 8 compares maximum, RMS, and mean errors for the Mitchell approximation versus our proposed linear-to-logarithmic conversion using Equation 9. While the Mitchell approximation yielded maximum error of −0.08607, RMS error of 0.06280, and average error of −0.05730, our proposed approach yielded maximum error of −0.00589, RMS error of 0.00333, and average error of −0.00274.

Table 2 below provides a summary of these performance measures for the linear-to-logarithmic domain conversion.

Note, these results are reported for only the mantissa part of the data, including the leading bit.

TABLE 2

| Linear-to-Logarithmic Domain Conversion Performance Summary | | | |
|---|---|---|---|
| | Mitchell Approximation | Proposed Approach (Equation 9) | Improvement |
| Worst Case Percentage Error | −5.792% | −0.318% | 18.2X |
| RMS Average Percentage Error | 4.244% | 0.216% | 19.6X |
| Average Percentage Error | −3.879% | −0.181% | 21.4X |
| Worst Case Error | −0.08607 | −0.00589 | 14.6X |
| RMS Average Error | 0.06280 | 0.00333 | 18.9X |
| Average Error | −0.05730 | −0.00274 | 20.9X |

5. MatMul Engine Circuit Architecture

Figure 9:
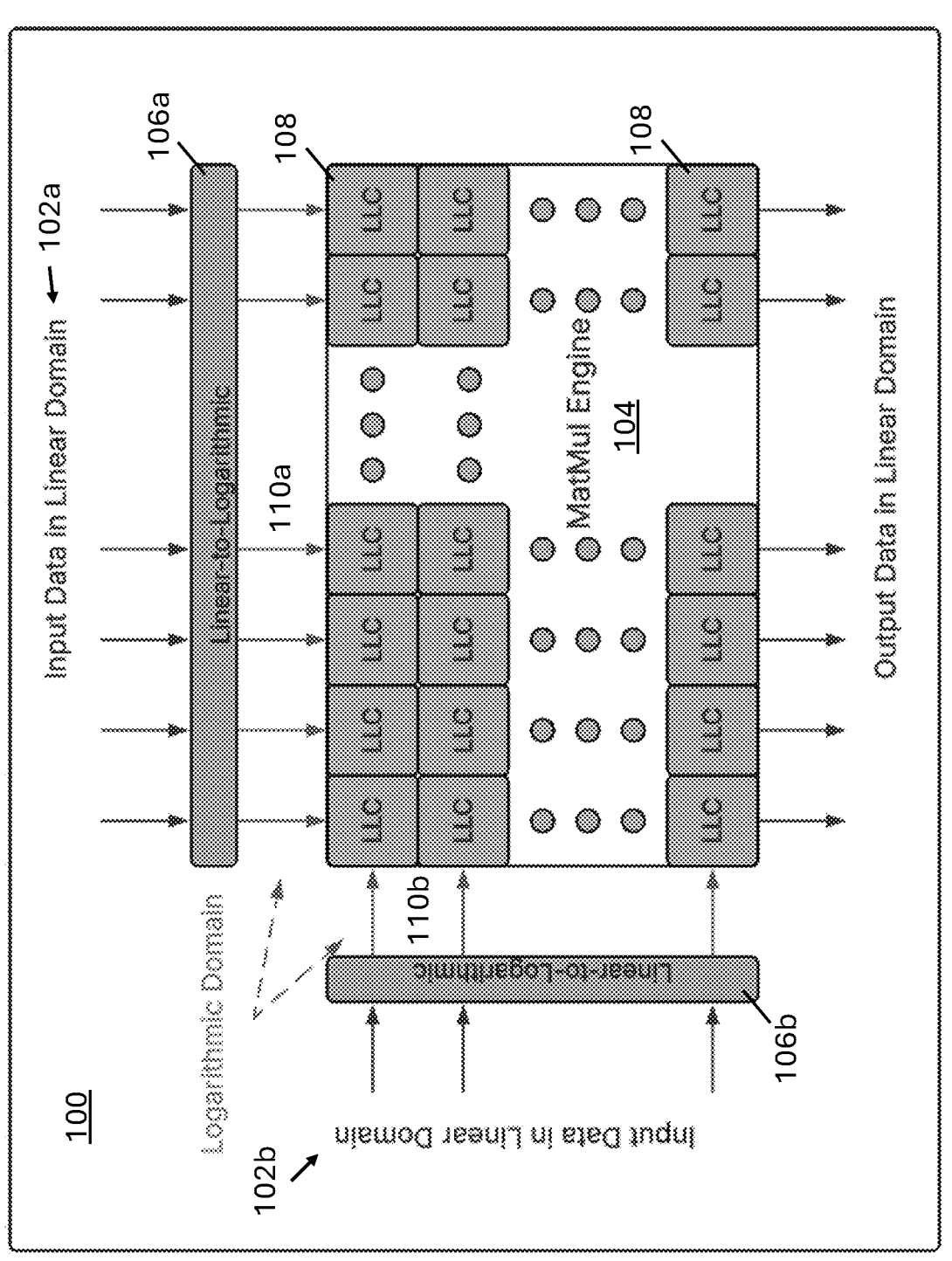
FIG. 9 illustrates a top-level circuit architecture of a matrix multiplication engine employing logarithmic arithmetic and bidirectional conversion in accordance with an embodiment of the present invention.

Referring to FIG. 9, a matrix multiplication engine 100 receives input operands 102a, 102b in the linear domain. Prior to entering a computation fabric 104, the operands are converted to the logarithmic domain by respective linear-to-logarithmic conversion circuits 106a, 106b. The linear-to-logarithmic conversion circuits convert the operands from the linear domain to the logarithmic domain according to Equation 9, above. That is, the mantissa range (0, 1) of the input operands is divided into four non-uniform windows and, for each input operand, the logarithm value of its mantissa portion, $m_{log}$, is determined by the appropriate expression in Equation 9 according to its linear domain mantissa value, $m_{lin}$. As discussed above, the window boundaries are not independently chosen but are instead derived from the window boundaries of the logarithmic-to-linear conversion shown in Equation 8. More specifically, the window boundaries are computed by applying the inverse mappings to the boundary points of the logarithmic-to-linear windows. Thus, each linear-to-logarithmic affine mapping is derived as the analytic inverse of a corresponding logarithmic-to-linear affine mapping. This derivation ensures that the two conversion circuits, linear-to-logarithmic and logarithmic-to-linear, are reciprocal.

In some embodiments, a single linear-to-logarithmic conversion circuit may be used as a shared resource and the operands 102a, 102b handled in a multiplexed fashion. Alternatively, the single linear-to-logarithmic conversion circuit may have a data path sufficiently wide enough to accommodate the operands 102a, 102b at the same time.

Figure 10:
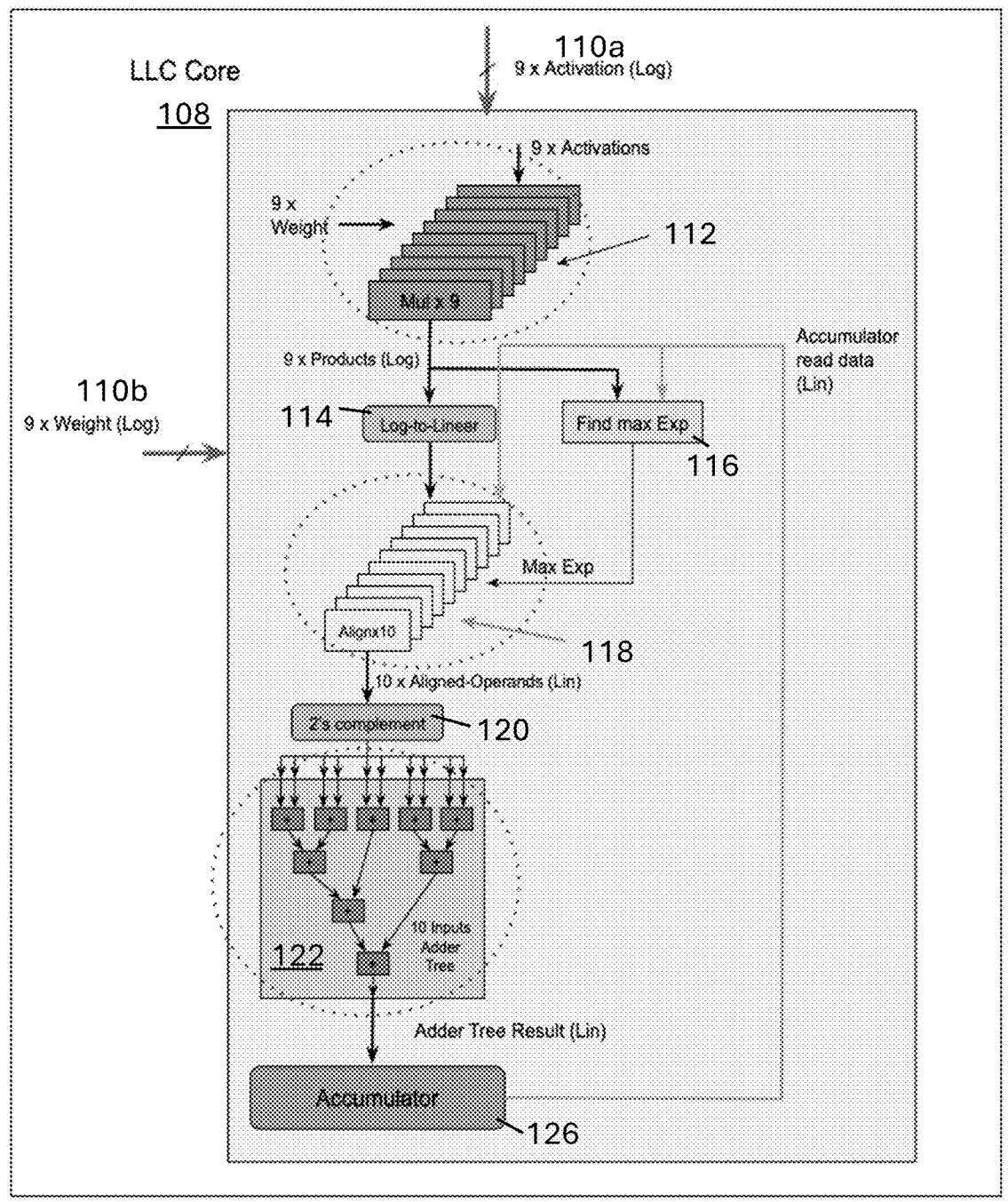
FIG. 10 illustrates a detailed logic structure of a logarithmic logic core within the matrix multiplication engine shown in FIG. 9 in accordance with an embodiment of the present invention.

The converted operands are distributed to a plurality of logarithmic logic cores (LLC) 108 of the computation fabric 104, where multiplication is performed in the logarithmic domain. FIG. 10 illustrates a detailed circuit structure of an individual logarithmic logic core (LLC) 108 within the matrix multiplication engine 100. Each logarithmic logic core is configured to compute a partial matrix multiplication result by performing multiplication in the logarithmic domain and accumulation in the linear domain.

As shown, the logarithmic logic core 108 receives operand values 110a, 110b that have already been converted from the linear domain to the logarithmic domain by the linear-to-logarithmic conversion circuit(s) 102a, 102b located upstream of the computation fabric. The logarithmic-domain operands are supplied to the core along both vertical and horizontal data paths.

The logarithmic logic core 108 includes a plurality of logarithmic-domain multipliers 112, illustrated in FIG. 16 as nine multipliers. Each multiplier performs multiplication by addition in the logarithmic domain, generating logarithmic-domain product values. These multipliers correspond, for example, to a dot-product operation between elements of an input or activation vector and a weight vector within the matrix multiplication engine.

Following logarithmic-domain multiplication, the product values are converted to the linear domain by a logarithmic-to-linear conversion circuit 114 located within the logarithmic logic core. As described above, in one embodiment this conversion operates on the mantissa portion of each logarithmic-domain product and applies piecewise affine mappings in accordance with Equation 8 implemented using shift and add operations. More specifically, the mantissa range [0,1) is divided into exactly four equal-width windows, each identifiable by two most-significant bits of the mantissa. For each window, an affine mapping is applied to generate a linear-domain mantissa value. Each affine mapping is implemented using only shift and add operations, avoiding lookup tables and general-purpose multipliers. The conversion is therefore highly suitable for implementation within a cost-sensitive matrix multiplication core. The placement of the logarithmic-to-linear conversion circuit within the core 108 allows conversion to occur immediately prior to accumulation, which is a cost-sensitive portion of the data path.

The logarithmic logic core further includes circuitry 116 for finding a maximum exponent among the converted product values. The maximum exponent is used as a reference for aligning the remaining operands prior to summation. Alignment circuits 118 shifts the linear-domain mantissa values relative to the maximum exponent to ensure correct numerical alignment before addition. This alignment step enables accurate accumulation of values having different exponents.

Aligned linear-domain values are supplied, via 2's complement logic 120, to a linear-domain adder tree 122, which sums multiple operands together. The 2's-complement logic enables subtraction required for exponent alignment and signed accumulation to be performed using the same linear-domain adder tree as addition, thereby reducing hardware complexity while preserving accurate linear-domain accumulation after logarithmic-to-linear conversion. In other embodiments, it may be replaced by appropriate subtraction logic.

FIG. 10 shows adder tree 122 configured to sum ten operands, including the converted product values and, where applicable, an accumulated partial sum. As illustrated, accumulation is performed entirely in the linear domain, avoiding the complexity of logarithmic-domain addition. The output of the adder tree 122 is written into an accumulator 126, allowing partial sums to be retained across multiple cycles or multiple matrix multiplication steps.

As mentioned, the logarithmic logic core illustrated in FIG. 10 performs no accumulation in the logarithmic domain. All summation operations occur exclusively after conversion to the linear domain. By confining logarithmic arithmetic to multiplication and performing accumulation only in the linear domain, the illustrated architecture avoids the complexity and approximation errors associated with logarithmic-domain addition while preserving the computational efficiency of logarithmic-domain multiplication.

Collectively then, the circuitry shown in FIG. 10 enables each logarithmic logic core to: perform multiplication efficiently in the logarithmic domain, convert results to the linear domain using hardware-efficient conversion, align operands based on exponent comparison, accumulate results accurately in the linear domain, and store normalized partial sums for subsequent computation. This organization allows the matrix multiplication engine to exploit the efficiency of logarithmic multiplication while preserving accurate linear-domain accumulation.

6. Reciprocal Design and Round-Trip Exactness

As should now be apparent, the logarithmic-to-linear and linear-to-logarithmic conversion circuits are co-designed as inverse pairs. For each window, the affine mapping of one circuit is the analytic inverse of the corresponding mapping of the other circuit. As a result, a value converted from one domain to the other and back again returns to its original value exactly, apart from quantization effects. This eliminates systematic bias that would otherwise accumulate during repeated conversions and summations in matrix multiplication operations. In some embodiments, additional fine-tuning terms may be applied within one or more windows to further subdivide the mantissa range and improve accuracy. Such fine-tuning may introduce additional sub-regions without increasing the number of primary windows.

7. Amortized Conversion Cost

As mentioned above, in one embodiment the linear-to-logarithmic conversion circuit is shared by multiple logarithmic logic cores. A conversion circuit is "shared" in this regard when a single instance of the circuit provides converted operand values to more than one logarithmic logic core, for example by broadcasting converted values to multiple cores, buffering converted values for reuse by multiple cores, and/or time-multiplexing conversion operations for distribution of converted values to multiple cores. Distribution of converted operand values may be performed by broadcasting, buffering, or time-multiplexing, without requiring simultaneous delivery to all logarithmic logic cores.

Because input operands are converted once and reused across multiple cores, the conversion cost is amortized over many multiplication operations. This architectural asymmetry allows the linear-to-logarithmic conversion to employ slightly more complex affine mappings while keeping overall system cost low. The illustrated architecture therefore provides a concrete hardware data path in which domain conversion, multiplication, alignment, and accumulation are explicitly separated and physically instantiated within the matrix multiplication engine.

Thus, methods and apparatus for logarithmic mathematics in AI matrix multiplications have been described. The described embodiments enable efficient and accurate matrix multiplication using logarithmic arithmetic by employing co-designed reciprocal conversion circuits with derived window boundaries and hardware-efficient affine mappings. The round-trip conversions, from the linear domain to the logarithmic domain and from the logarithmic domain to the linear domain, do not introduce any mathematical errors; therefore, there is no systematic error. Indeed, the conversions as proposed in this disclosure are not only highly accurate but also highly hardware-efficient, keeping implementation costs to a minimum. The conversion from the logarithmic domain to the linear domain occurs within the matrix multiplication engine, which is highly cost-sensitive. Therefore, the conversion implementations described herein, for example wherein the entire mantissa range is divided equally into four regions and each region is identifiable by two most-significant mantissa bit, were chosen to favor hardware implementation. Divisions by values such as 4, 32, and 128 are reduced to simple shift operations. The conversion from the linear domain to the logarithmic domain occurs outside the matrix multiplication engine.

Since the cost of a single conversion is amortized over N (where N represents a shared inner dimension of the two matrices being multiplied together), this conversion process is less cost-sensitive in terms of its demand on computational resources.

What is claimed is:

1. A processing system for performing matrix multiplication, comprising:
   a matrix multiplication engine comprising a plurality of logarithmic logic cores, each logarithmic logic core configured to perform multiplication in a logarithmic domain and accumulation in a linear domain;
   a linear-to-logarithmic conversion circuit positioned upstream of the matrix multiplication engine and shared by the plurality of logarithmic logic cores, the linear-to-logarithmic conversion circuit configured to convert input operand values from the linear domain to the logarithmic domain prior to distribution to the logarithmic logic cores, the linear-to-logarithmic conversion circuit comprising:
      a mantissa window selector configured to divide a mantissa range of a linear-domain operand into exactly four non-uniform windows; and
      for each of the four non-uniform windows, a corresponding affine mapping implemented using only shift and add operations to generate a logarithmic-domain mantissa value;
   a logarithmic-to-linear conversion circuit disposed within each logarithmic logic core and configured to convert logarithmic-domain multiplication results to linear-domain values prior to accumulation, the logarithmic-to-linear conversion circuit comprising:
      a mantissa window selector configured to divide a mantissa range [0,1) of a logarithmic-domain value into exactly four equal-width windows, each identifiable based on most-significant mantissa bits; and
      for each of the four equal-width windows, a corresponding affine mapping implemented using only shift and add operations to generate a linear-domain mantissa value;
   wherein:
      each affine mapping of the linear-to-logarithmic conversion circuit is an analytic inverse of a corresponding affine mapping of the logarithmic-to-linear conversion circuit;
      non-uniform window boundaries of the linear-to-logarithmic conversion circuit are computed from window boundaries of the logarithmic-to-linear conversion circuit by inverse mapping; and
      the linear-to-logarithmic conversion circuit and the logarithmic-to-linear conversion circuit are co-designed such that a round-trip conversion of a mantissa through both conversion circuits is mathematically exact apart from quantization effects, thereby avoiding systematic bias during accumulation within the matrix multiplication engine.

2. The processing system of claim 1, wherein the four equal-width windows of the logarithmic-to-linear conversion circuit each span one-quarter of the mantissa range [0,1).

3. The processing system of claim 1, wherein the mantissa window selector of the logarithmic-to-linear conversion circuit identifies the four equal-width windows using two most-significant mantissa bits.

4. The processing system of claim 1, wherein the non-uniform window boundaries of the linear-to-logarithmic conversion circuit correspond to inverse images of boundary points of the four equal-width windows of the logarithmic-to-linear conversion circuit.

5. The processing system of claim 4, wherein the inverse images are computed by algebraic inversion of affine mappings of the logarithmic-to-linear conversion circuit.

6. The processing system of claim 1, wherein each affine mapping of the linear-to-logarithmic conversion circuit and its corresponding affine mapping of the logarithmic-to-linear conversion circuit form a bijective pair over a corresponding window.

7. The processing system of claim 1, wherein the round-trip conversion preserves monotonic ordering of mantissa values across all four windows.

8. The processing system of claim 1, wherein the round-trip conversion introduces no systematic bias in accumulated results across repeated matrix multiplication operations.

9. The processing system of claim 1, wherein each affine mapping of the linear-to-logarithmic conversion circuit and the logarithmic-to-linear conversion circuit is implemented without a lookup table and without a general-purpose multiplier.

10. The processing system of claim 1, wherein each affine mapping of the linear-to-logarithmic conversion circuit and the logarithmic-to-linear conversion circuit comprises only bit-shift operations, add operations, and subtract operations.

11. The processing system of claim 1, wherein coefficients used in affine mappings are powers of two or sums of powers of two.

12. The processing system of claim 1, wherein the mantissa corresponds to a mantissa of a floating-point value formatted according to an IEEE-754 standard.

13. The processing system of claim 12, wherein the floating-point value is a half-precision floating-point value.

14. The processing system of claim 1, wherein exponent values are preserved during conversion and only mantissa values are modified by the linear-to-logarithmic conversion circuit and the logarithmic-to-linear conversion circuit.

15. The processing system of claim 1, wherein the linear-to-logarithmic conversion circuit is configured to convert input operands once and distribute converted operands to multiple logarithmic logic cores.

16. The processing system of claim 1, wherein each logarithmic logic core comprises a plurality of logarithmic-domain multipliers and a linear-domain adder tree.

17. The processing system of claim 16, wherein the logarithmic-to-linear conversion circuit is positioned between the logarithmic-domain multipliers and the linear-domain adder tree.

18. The processing system of claim 1, wherein accumulation is performed only in the linear domain.

19. A method for performing matrix multiplication by a processing system comprising a matrix multiplication engine comprising a plurality of logarithmic logic cores, a linear-to-logarithmic conversion circuit and a logarithmic-to-linear conversion circuit, each logarithmic logic core configured to perform multiplication in a logarithmic domain and accumulation in a linear domain, the method comprising:
   converting, by the linear-to-logarithmic conversion circuit comprising a mantissa window selector, wherein the linear-to-logarithmic conversion circuit is positioned upstream of the matrix multiplication engine and shared by the plurality of logarithmic logic cores, input operand values from a linear domain to a logarithmic domain using a linear-to-logarithmic conversion, the linear-to-logarithmic conversion comprising:

dividing, by the mantissa window selector, a mantissa range of each linear-domain operand into exactly four non-uniform windows; and applying, within each of the four non-uniform windows, a corresponding affine mapping implemented using only shift and add operations to generate a logarithmic-domain mantissa value;

distributing the operand values in logarithmic domain to the plurality of logarithmic logic cores;

within each of the plurality of logarithmic logic cores:

performing multiplication in the logarithmic domain to produce logarithmic-domain multiplication results;

converting, by the logarithmic-to-linear conversion circuit disposed within each logarithmic logic core, the logarithmic-domain multiplication results to linear-domain values using a logarithmic-to-linear conversion, the logarithmic-to-linear conversion comprising:

dividing a mantissa range $[0,1)$ of each logarithmic-domain multiplication result into exactly four equal-width windows; and applying, within each equal-width window, a corresponding affine mapping implemented using only shift and add operations to generate a linear-domain mantissa value; and accumulating the linear-domain values;

wherein:

affine mappings used in the linear-to-logarithmic conversion are analytic inverses of corresponding affine mappings used in the logarithmic-to-linear conversion;

boundaries of the four non-uniform windows used in the linear-to-logarithmic conversion are computed from window boundaries of the logarithmic-to-linear conversion by inverse mapping; and a round-trip conversion of a mantissa from the linear domain to the logarithmic domain and back to the linear domain is mathematically exact apart from quantization effects, thereby avoiding systematic bias during accumulation.

20. The method of claim 19, wherein dividing the mantissa range $[0,1)$ into four equal-width windows comprises identifying the four equal-width windows using two most-significant mantissa bits.

21. The method of claim 19, wherein computing the boundaries of the four non-uniform windows comprises applying inverse affine mappings to boundary points of the four equal-width windows.

22. The method of claim 19, wherein the inverse affine mappings are algebraic inverses of affine mappings used in the logarithmic-to-linear conversion.

23. The method of claim 19, wherein each affine mapping of the linear-to-logarithmic conversion and its corresponding inverse affine mapping of the logarithmic-to-linear conversion form a bijective mapping over a corresponding window.

24. The method of claim 19, wherein the round-trip conversion preserves monotonic ordering of mantissa values.

25. The method of claim 19, wherein the round-trip conversion introduces no systematic bias across repeated matrix multiplication operations.

26. The method of claim 19, wherein the affine mappings of the linear-to-logarithmic conversion and the logarithmic-to-linear conversion are implemented without lookup tables and without general-purpose multipliers.

27. The method of claim 19, wherein coefficients used in the affine mappings of the linear-to-logarithmic conversion and the logarithmic-to-linear conversion are powers of two or sums of powers of two.

28. The method of claim 19, wherein the mantissa corresponds to a mantissa of a floating-point value formatted according to an IEEE-754 standard.

29. The method of claim 28, wherein the floating-point value is a half-precision floating-point value.

30. The method of claim 19, wherein exponent values are preserved during conversion and only mantissa values are modified.

* * * * *